March 8, 1932.　　A. S. HOWELL　　1,848,253
LENS STRUCTURE
Filed Dec. 3, 1928　　2 Sheets-Sheet 1

Inventor:-
Albert S. Howell
By:- Miehle & Miehle
Attys

March 8, 1932.   A. S. HOWELL   1,848,253
LENS STRUCTURE
Filed Dec. 3, 1928   2 Sheets-Sheet 2
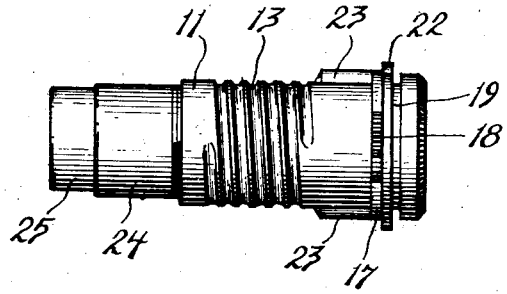
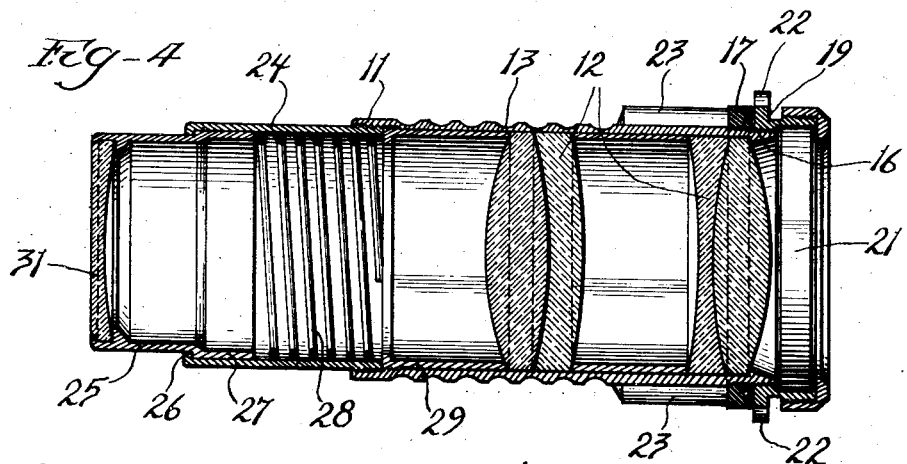
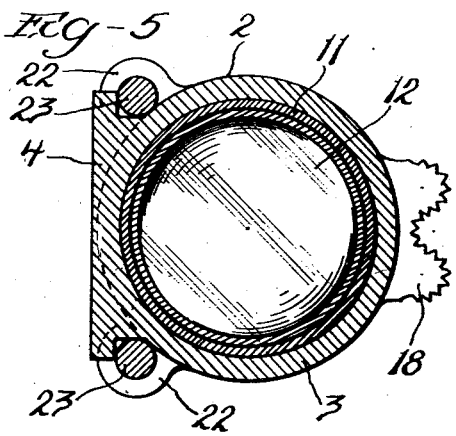 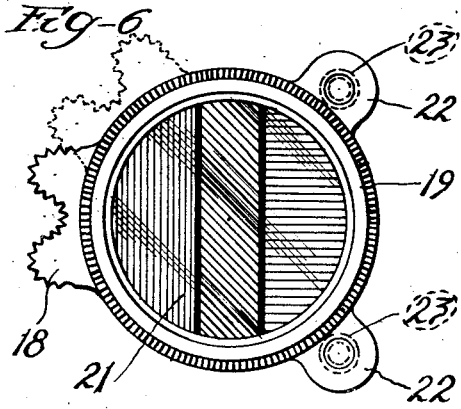
Inventor:-
Albert S. Howell
By:- Miehle & Miehle,
Atty's.

Patented Mar. 8, 1932

1,848,253

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

LENS STRUCTURE

Application filed December 3, 1928. Serial No. 323,224.

My invention relates particularly to motion picture projection lenses which as are used in the projection of motion pictures in color although not limited to this use alone.

The general object of my invention resides in the provision of an effective and desirable lens structure in which several cooperating elements are assembled in a unitary structure which provides for relative movement of the several elements for the purpose of providing for adjustment of one of the elements while the other element or elements are maintained in proper adjustment for the functioning of the device, with a view toward a unitary structure providing for convenient installation and removal, and particularly with a view toward the provision of a unitary projection lens structure for the projection of motion pictures in color, in co-operation with a certain type of motion picture film designed for the purpose of the projection of pictures in color, and adapted to be quickly and conveniently interchanged with ordinary projection lenses on a certain type of motion picture projecting machine and without necessitating any alteration of the machine.

With this object in view my invention consists in certain features of novelty in the construction, combination and arrangement of parts by which the said object and certain other objects, hereinafter appearing, are effected, all as fully described with reference to the accompanying drawings, and more particularly pointed out in the appended claims.

In the said drawings,—

Figure 3 is a side elevation of the lens structure embodying my invention;

Figure 4 is an enlarged section of the same taken on the vertical axial plane thereof;

Figure 5 is a section on the line 5—5 of Figure 2; and

Figure 6 is a front elevation of the lens structure.

Like characters of reference indicate like parts in the several views.

Figure 1:
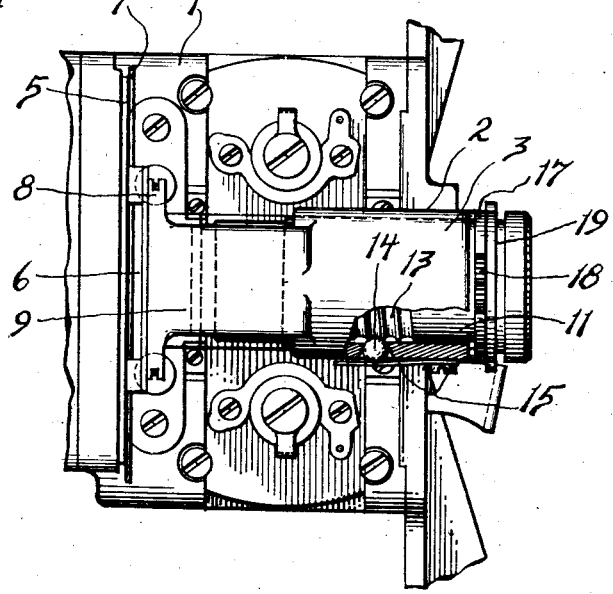
Figure 1 is a partial side elevation of a motion picture projecting machine equipped with a lens structure embodying my invention with a part broken away and shown in section.
Figure 2:
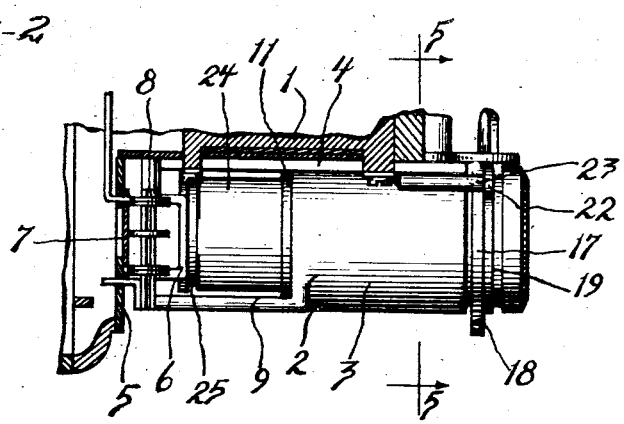
Figure 2 is a partial top plan view of the same with parts broken away and shown in section.

Referring to the drawings, 1 designates generally the frame of the projecting machine, and a lens mounting member 2 having a bored cylindrical portion 3 is mounted on the frame for movement axially of the portion 3, for purposes unnecessary to be stated, by means of a lateral formation 4 formed thereon and extending longitudinally thereof and slidably mounted on the frame 1 in a manner unnecessary to be described. See Figures 1, 2 and 5.

Disposed at the rear of the mounting member 2 is an apertured intermittent film feed guide including a rear film face guide member 5 carried on the frame 1, and a front film face guide member 6 which is of U-shape in a horizontal plane and has the intermediate portion thereof disposed forwardly of a film 7 in the guide. See particularly Figure 2.

The front film face guide member 6 is carried on the mounting 2 by means of a rearwardly disposed transverse portion 8 which is connected with the main portion of the mounting 2 by a rearward extension of the formation 4 and a connecting portion 9 on the opposite side of the mounting.

A lens cylinder 11 has a projection lens 12, comprising two separated components, mounted therein, and is removably engageable in the bore of the portion 3 of the mounting 2 for axial and angular movement with respect thereto. See Figures 1, 2, 3 and 4. The cylinder 11 is provided with an exterior screwthread 13 which is engaged by a ball 14 engaged in a radial aperture in the cylindrical portion 3 and spring pressed into engagement with the screwthread 13 by means of a spring 15 to effect axial adjustment of the cylinder 11 with angular movement thereof with respect to the mounting 2. See Figure 1.

By exerting axial pressure upon the cylinder 11 the ball 14 will release from the screwthread 13 against the influence of the spring 15 to permit direct axial movement of the cylinder 11 for rough adjustment of the lens 12 and for convenient removal and mounting of the cylinder 11, the aperture in which the ball 14 is engaged being restricted inwardly to retain the ball therein and to properly restrict inward movement thereof.

The lens cylinder 11 is provided at its front end with an exterior screw thread 16 of a fine pitch, see Figure 4, and screwthreaded on this screwthread and jammed at the inner end thereof is a ring 17 which is provided with an exterior radially extending finger engaging portion 18 for the convenient manipulation of the lens cylinder.

Screwthreaded upon the screwthread 16 in front of the ring 17 is a color filter carrier 19 which is by reason of this engagement angularly movable relatively to the lens cylinder and which is substantially axially fixed therewith. Mounted on the carrier 19 is a color filter 21 comprising vertical sections of different colors for cooperation with the aforementioned type of film. See Figure 6.

The filter carrier 19 is provided with a pair of angularly spaced exterior ears 22 on which are secured a pair of studs 23 which extend rearwardly in angularly spaced relation for sliding engagement with the aforementioned lateral formation 4 of the mounting 2 for predeterminately positioning the filter carrier 19 angularly in order that the sections of the filter 21 be maintained in proper relation with the film 7 in the aforementioned guide. See Figures 2, 3, 4 and 5.

Thus, the filter is mounted on the projection lens for removal and installation therewith, and, when installed on the mounting 2, the lens cylinder 11 is adjusted roughly by axial movement thereof, after which a close adjustment is effected by operating the lens cylinder angularly, by manipulation of the finger engaging finger portion 18, to effect axial movement of the lens cylinder by the cooperation of the screwthread 13 and the ball 14 engaged therewith, the studs 23 maintaining the filter 21 in proper angular position and permitting axial movement thereof with the lens cylinder by reason of the sliding engagement of the studs with the lateral formation 4.

The lens cylinder 11 is extended rearwardly by means of a cylinder 24 screwthreaded into the rear end of the lens cylinder 11. See Figures 2, 3 and 4. Telescopically engaged within the cylinder 24 for sliding movement and extending rearwardly therefrom is a compensating lens cylinder 25. Rearward movement of the cylinder 25 with respect to the cylinders 11 and 24 is limited by an inwardly projecting annular flange 26 on the rear end of the cylinder 24 engaging a shoulder on the cylinder 25 formed by the forward end portion 27 thereof, disposed forwardly of the flange 26, being enlarged to slidably engage the inner surface of the cylinder 24.

A helical compression spring 28 is disposed within the cylinder 24 and abuts the front end of the cylinder 25 and the rear end of a lens securing sleeve 29 secured within the rear portion of the cylinder 11, and yieldably urges the cylinder 25 rearwardly with respect to the cylinder 11. A compensating lens 31 is mounted at the rear end of the cylinder 25.

When the lens structure is installed on the mounting 2, the spring 28 maintains the cylinder 25 with its rear end abutting the transverse portion of the front film guide member 6 so that the lens 31 is maintained at a fixed distance from the film 7 in the guide throughout axial adjustment of the cylinder 11 carrying the projection lens 12.

Thus, it will be observed that a unitary lens structure is provided which permits of removal and installation thereof as a unit and which permits of convenient adjustment of the projection lens 12 without disturbing the fixed angular adjustment of the filter 21 or the fixed axial adjustment of the compensating lens 25 necessary for their proper functioning.

As to the functioning of the device the projection lens 12 functions to project the image on the film 7, and the filter 21 cooperates with a plurality of cylindrical lens formations on the film to effect the color of the projected image, while the compensating lens 25 effects the pick up from the film in the same angular relation in which the light was transmitted to the film in photographically exposing the same.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a device of the character described the combination with an optical element carrying cylinder removably engageable in a bored mounting for axial and angular movement with respect thereto and provided with an exterior screwthread forming a part of a releasable means for adjusting said cylinder with angular movement thereof and provided with a second exterior screwthread of fine pitch at its front end, a ring screwthreaded on said second screwthread and angularly fixed with said cylinder and provided with an exterior radially extending finger engaging portion, a carrier disposed in front of said ring and screwthreaded on said second screwthread for angular movement with respect to said cylinder, and a pair of studs on said carrier and angularly spaced thereon and extending rearwardly therefrom exterior of said ring for sliding engagement on opposite sides of a lateral formation on said mounting for positioning said carrier angularly.

2. In a device of the character described the combination with a projection lens carrier removably engageable in a mounting for axial and angular movement with respect thereto, of a color filter carrier mounted on said lens carrier for relative angular movement with respect thereto, means positioning said filter carrier angularly with said mounting and adapted to permit removal of said filter carrier with said lens carrier, a compensating lens carrier carried on said projection lens carrier for removal therewith and axially movable with respect thereto, and spring means carried with said lens carriers and yieldably urging said compensating lens carrier in one direction axially with respect to said projection lens carrier.

3. In a device of the character described the combination with a projection lens cylinder removably engageable in a bored mounting for axial and angular movement with respect thereto, of a color filter carrier mounted on the front end of said cylinder for relative angular movement with respect thereto and axially fixed therewith, means for predeterminately positioning said filter carrier angularly with respect to said mounting and adapted to permit axial movement and removal of said filter carrier with said cylinder, a compensating lens carrier mounted on the rear end of said cylinder for removal therewith and for axial movement with respect thereto, stop means limiting rearward movement of said compensating lens carrier with respect to said cylinder, and spring means yieldably urging said compensating lens carrier rearwardly with respect to said cylinder.

4. In a device of the character described the combination with a projection lens cylinder removably engageable in a bored mounting for axial and angular movement with respect thereto and provided with an exterior screwthread forming a part of a releaseable means for axially adjusting said cylinder with angular movement thereof, of a color filter carrier mounted on the front end of said cylinder for relative angular movement with respect thereto and axially fixed therewith, a pair of studs on said filter carrier and angularly spaced thereon and extending rearwardly therefrom in spaced relation with said cylinder for sliding engagement with opposite sides of a lateral formation on said mounting for positioning said filter carrier angularly, of a compensating lens cylinder telescopically engaged with said projection lens cylinder at the rear end thereof, stop means limiting rearward movement of said compensating lens cylinder with respect to said projection lens carrier, and spring means carried with said cylinders and yieldably urging said compensating lens cylinder rearwardly with respect to said projection lens cylinder.

In witness whereof I hereunto affix my signature this 21st day of November, 1928.

ALBERT S. HOWELL.